United States Patent
Daneshvar

[19]

[11] Patent Number: 5,853,025
[45] Date of Patent: Dec. 29, 1998

[54] WINDSHIELD FLUID DELIVERY SYSTEM

[76] Inventor: Yousef Daneshvar, 21459 Woodfarm, Northville, Mich. 48167

[21] Appl. No.: 783,262

[22] Filed: Jan. 15, 1997

Related U.S. Application Data

[60] Provisional application No. 60/009,805 Jan. 16, 1996.
[51] Int. Cl.⁶ ........................................................ E03B 5/00
[52] U.S. Cl. ........................ 137/565; 137/571; 239/284.1
[58] Field of Search ..................... 137/571, 565; 239/284.1, 284.2; 222/333

[56] References Cited

U.S. PATENT DOCUMENTS

| | | | |
|---|---|---|---|
| 2,126,624 | 8/1938 | Eaddy | 239/284.1 |
| 2,594,437 | 4/1952 | Horton | 239/284.1 |
| 2,626,184 | 1/1953 | Caldwell | 239/284.1 |
| 2,634,166 | 4/1953 | Sacchini | 239/284.1 |
| 2,673,762 | 3/1954 | Doyle, Jr. | 137/565 |
| 3,010,473 | 11/1961 | McCurnin | 239/284.1 |
| 3,213,493 | 10/1965 | Chichester | 239/284.1 |
| 4,226,267 | 10/1980 | Meacham, Jr. | 137/565 |
| 4,801,088 | 1/1989 | Baker | 222/333 |
| 5,327,613 | 7/1994 | Ohtsu | 239/284.1 |

FOREIGN PATENT DOCUMENTS

| | | | |
|---|---|---|---|
| 2211273 | 9/1973 | Germany | 239/284.1 |
| 2338646 | 2/1975 | Germany | 239/284.1 |

*Primary Examiner*—Denise L. Ferensic
*Assistant Examiner*—John Ball

[57] ABSTRACT

This invention deals with the problem of providing liquid for the windshield or windows of vehicles. In general, the job of filling an empty windshield container under the hood of the cars is a difficult task and can be dangerous. In order to prevent such a case, this application provides methods that allow the process of filling an existing windshield fluid container to be done from inside the vehicle or from another convenient area adjacent to the vehicle. This model allows a hand-held pump or an electrical pump to be used to pump the fluid from a windshield fluid container into the existing windshield fluid container. Therefore, it will eliminate the need to open the hood of the vehicle and to do a difficult task for this purpose. In some models, the windshield fluid container may be placed in the trunk of the vehicle and will have a switch on the dashboard in order to activate the pump to pump the fluid when needed.

18 Claims, 8 Drawing Sheets

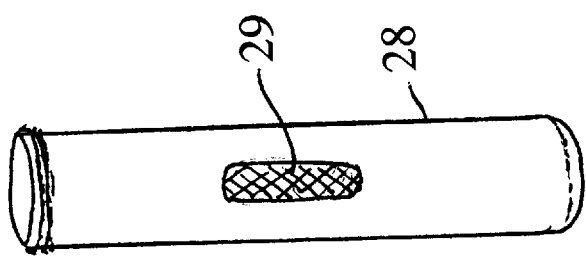

WINDSHIELD FLUID DELIVERY SYSTEM

This application claims the priority of the Provisional Application No. 60/009,805, filed Jan. 16, 1996.

BACKGROUND OF THIS INVENTION

This invention deals with the problem of providing liquid for the windshield or vehicle windows. In routine life and on long drives when the roads are dirty the windshields has to be washed frequently and so the fluid will finish and needs to be replaced. However, replacement of fluid in the vehicles is not easy and it requires opening the hood and reaching the container. This is difficult, unpractical and, at times, even dangerous, especially for an untrained personnel and particularly in a wrong place in a dark condition, in the cold, and in the middle of a blizzard. For this reason, this applicant introduces his own methods and units that eliminate this problem.

BRIEF EXPLANATION OF INVENTION

This invention introduces a special mean that will allow the fluid to be injected into the washer container of the vehicles. In this method a container of windshield fluid will be attached to a suction pump by a tubing and cap system which is placed inside the vehicle. The pump will be energized by the car's battery or another battery and will pump the fluid into the existing windshield fluid container of the vehicle. The unit may use various indicators to alert thy driver of the low level fluid inside the existing windshield container of the vehicle and to stop pumping when it is full. Some parts of this delivery unit may be placed in any proper area of the vehicle: inside, outside, in the trunk, etc.

THE FIGURES

Please notice that the reason the figures are multiple is simply due to the fact that the applicant was not able to provide all the details and options of this invention in one figure.

Therefore, to prevent confusion he has schematically illustrated the various important features and parts of this invention in different figures. Importantly, the main idea is to be used in the main embodiment; naturally, various models may be made based on these teachings.

BRIEF DESCRIPTION OF THE FIGURES

FIG. 9 shows a flat protective cover piece that is will go over the tubes of the cap of the suction piece.

DETAILED EXPLANATION OF THE FIGURES

Figure 1:
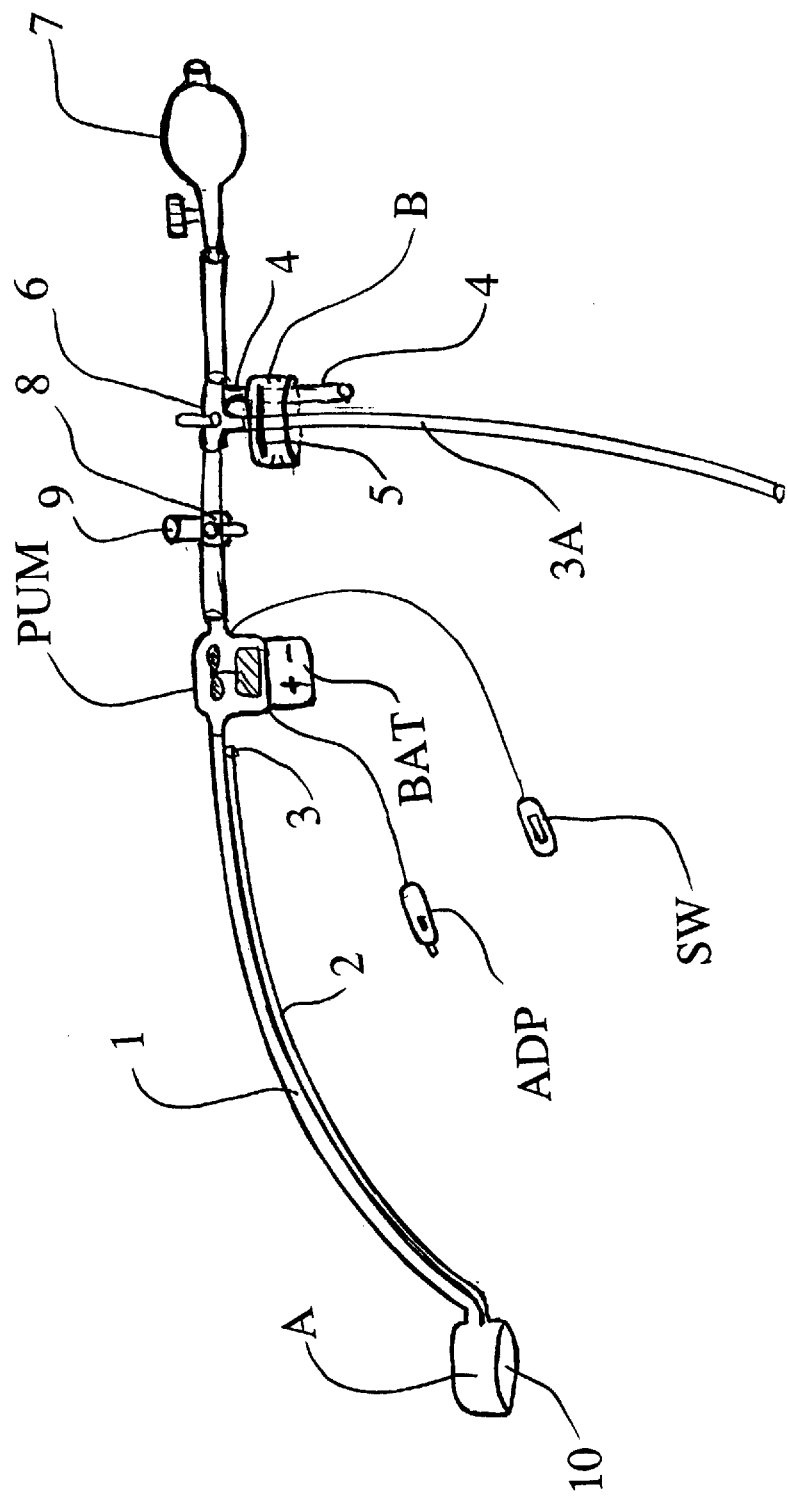
FIG. 1 shows the general construction of a windshield fluid disposing system.

FIG. 1 shows schematically the general construction of a windshield fluid disposing system. In this model, the unit has a cap A that is shaped and sized to match the top of the windshield fluid container of the vehicle. The unit also has a cap B which will fit the opening of the bottle of the fresh windshield fluid container. This is chosen to be convenient since it will eliminate the extra work of moving the fluid from one container to another by hand. This cap is made to allow it to be rotated and tightened around the container of the fresh windshield fluid in order to prevent the fluid from leaking. This cap has a piece 5 that will fit the opening of the cap of the fresh windshield fluid container and will allow body B to be rotated to be fixed on the top of the fresh windshield fluid container. The pump is shown at PUM. It will pump the fluid out of the fresh windshield fluid container and will pump it into the windshield fluid container of the vehicle via tubing 1. Tube 1 may also have a tube 2 next to it in order to allow the air to escape the windshield fluid container of the vehicle by the opening 3 of this tube. The pump PUM may use a battery shown at BAT for the energy or it may be connected to the electricity of the vehicle by an adaptor symbolically shown at ADP. The pump will be controlled by a switch SW. This unit may be pumped by a hand pump symbolically shown at 7. The unit will also use the three-way stopcock 6 to allow the direction of the air and the fluid to be controlled. Tube 4 will allow the air to be pumped into the bottle of the fresh windshield fluid container and tube 3A will allow the fluid to be taken out of the container. The three-way stopcock 8 will allow another tube to be connected to this system. And the opening 9 will be used for this purpose.

Importantly, instead of the hand pump 7 an electrical pump may also be used to pump air into the container and to pump the fluid out of the container. Proper sealing means may be used to prevent air and fluid leaks if needed.

Importantly, the electrical pump PUM of this unit may be placed in any proper area of the car in the passenger compartment or the engine compartment. It may be attached to the body of the car in the engine compartment and to be attached to the electrical system of the car and only its tubings to be extended to the existing windshield container from one side and to the cap B from the other side.

Figure 2:
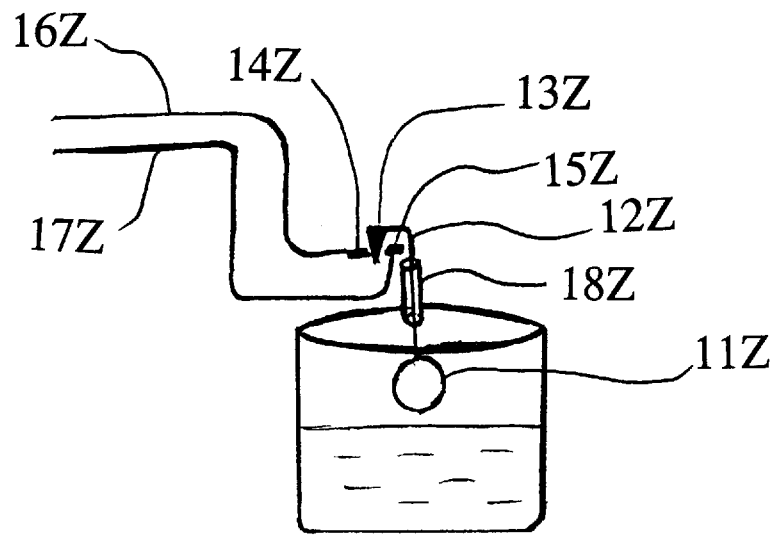
FIG. 2 shows methods that will turn an electrical system off if the fluid level reaches a set level.

FIG. 2 schematically shows one of the methods that can be used in order to allow the electrical system to be continued as long as the level of the fluid is lower than a set level. In this fig a container holds a fluid and an air-filled small globe 11Z has a lever 12Z which is connected to a cone-shaped electrically conductor piece 13Z. When the level of the fluid is low, the globe will move down along the tube 18Z that holds the lever 12 securely. The tube 18Z will be fixed to the body of the windshield fluid container or in some cases to the cap of the windshield fluid container. Then cone 13Z will connect the electrical leads 14Z and 15Z electrically and this action will make the electrical circuit between the wire means 16Z and 17Z complete and this electrical circuit can be used for various purposes. In this case, the electricity will turn the pump on and will keep it going as long as the fluid level is high enough to raise the globe above the desired level which will then shut the pump off.

Figure 3:
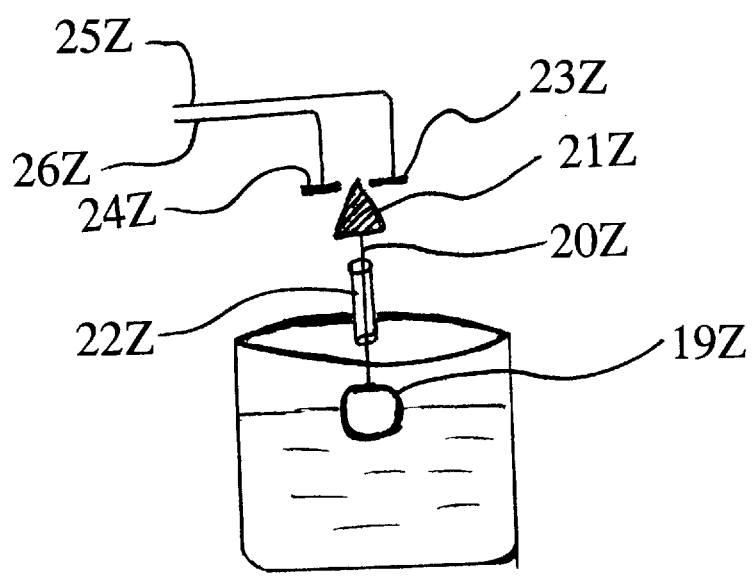
FIG. 3 shows a method which will turn an electrical system off if the fluid level falls from a set level.

FIG. 3 shows schematically one of the methods that will do the job of the unit shown in FIG. 2 in reverse. This unit will be used to turn the electrical system off and turn on an alarm (the alarm is not shown in these pictures) if the level of the fluid is lower than a set level. In this Figure, a container holds a fluid and an air-filled small globe 19Z which is connected to a lever 20Z which by itself is connected to a cone-shaped electrical conductor 21Z. When the level of the fluid is high the globe will move up along the tube 22Z which holds the lever 20Z securely while it allows the lever 20Z to move up and down. The tube 22Z will be fixed to the body of the existing windshield fluid container or to the cap of such container. Cone 21Z will connect the leads 23Z and 24Z electrically and this will make the electrical circuit between the wire means 25Z and 26Z complete and able to be used for any purpose. In this case this electrical circuit will prevent an alarm from sounding and it will also allow the pump PUM to run. When the fluid level falls lower than a set level the electrical system will turn off and it will sound an alarm to indicate the lack of fluid. This unit will be made small to be placed inside the container of the fresh windshield fluid or it may be miniaturized to be part of cap B.

Figure 4:
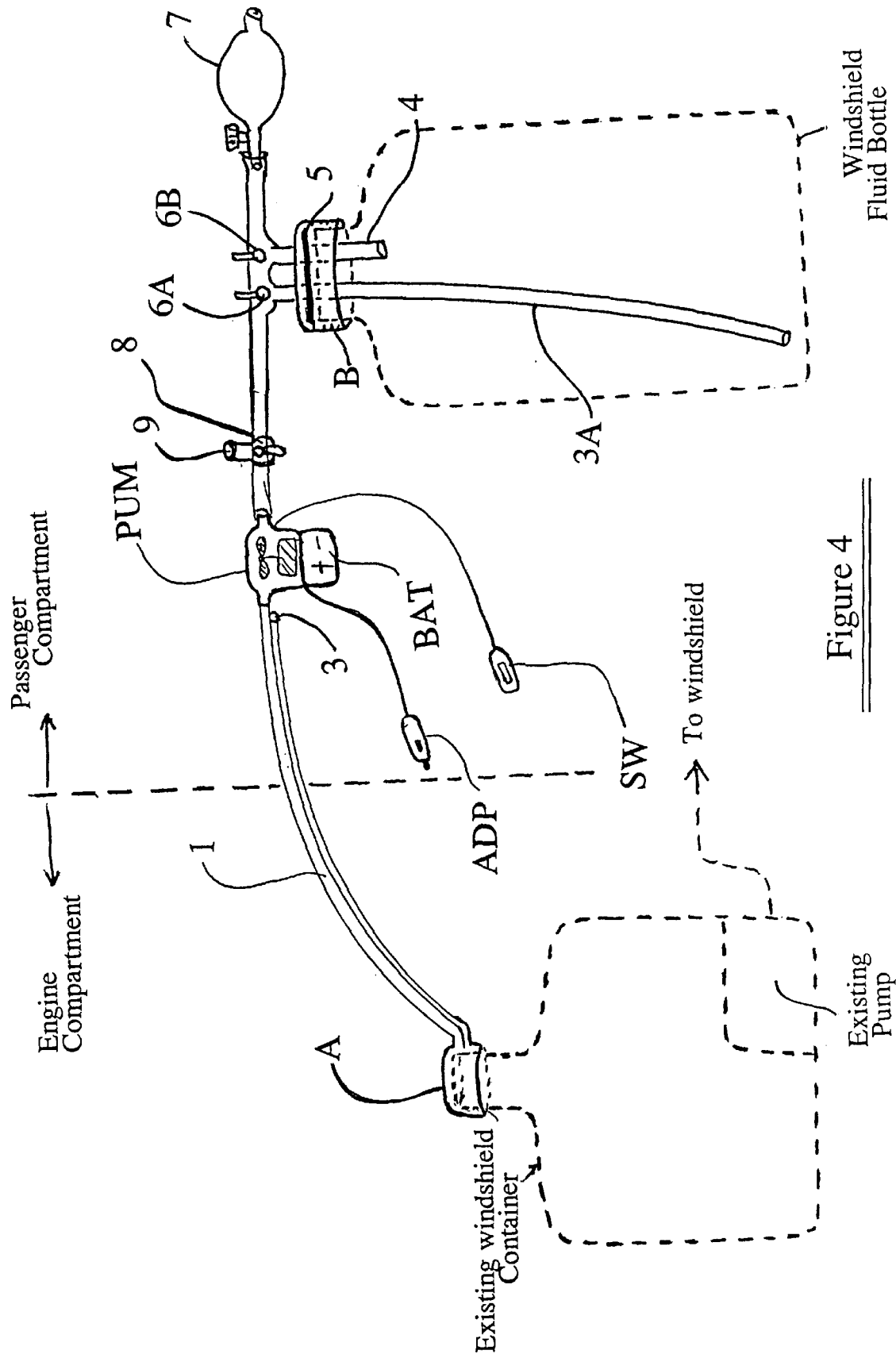
FIG. 4 shows a windshield fluid disposing system with two three-way stopcocks.

FIG. 4 shows schematically a windshield fluid disposing system which is similar to the unit shown in FIG. 1 except that in this figure the unit has a three-way stopcock 6B that allows the direction of fluid to be chosen more easily and it allows for closure of the openings that are desired to be closed. It also schematically shows the passenger and the engine compartments, as well as schematically showing the existing windshield container and its related pump and how the fluid eventually moves to the windshield. Also, the windshield fluid bottle is shown schematically; cap B attaches to it to secure piece 5.

Figure 5:
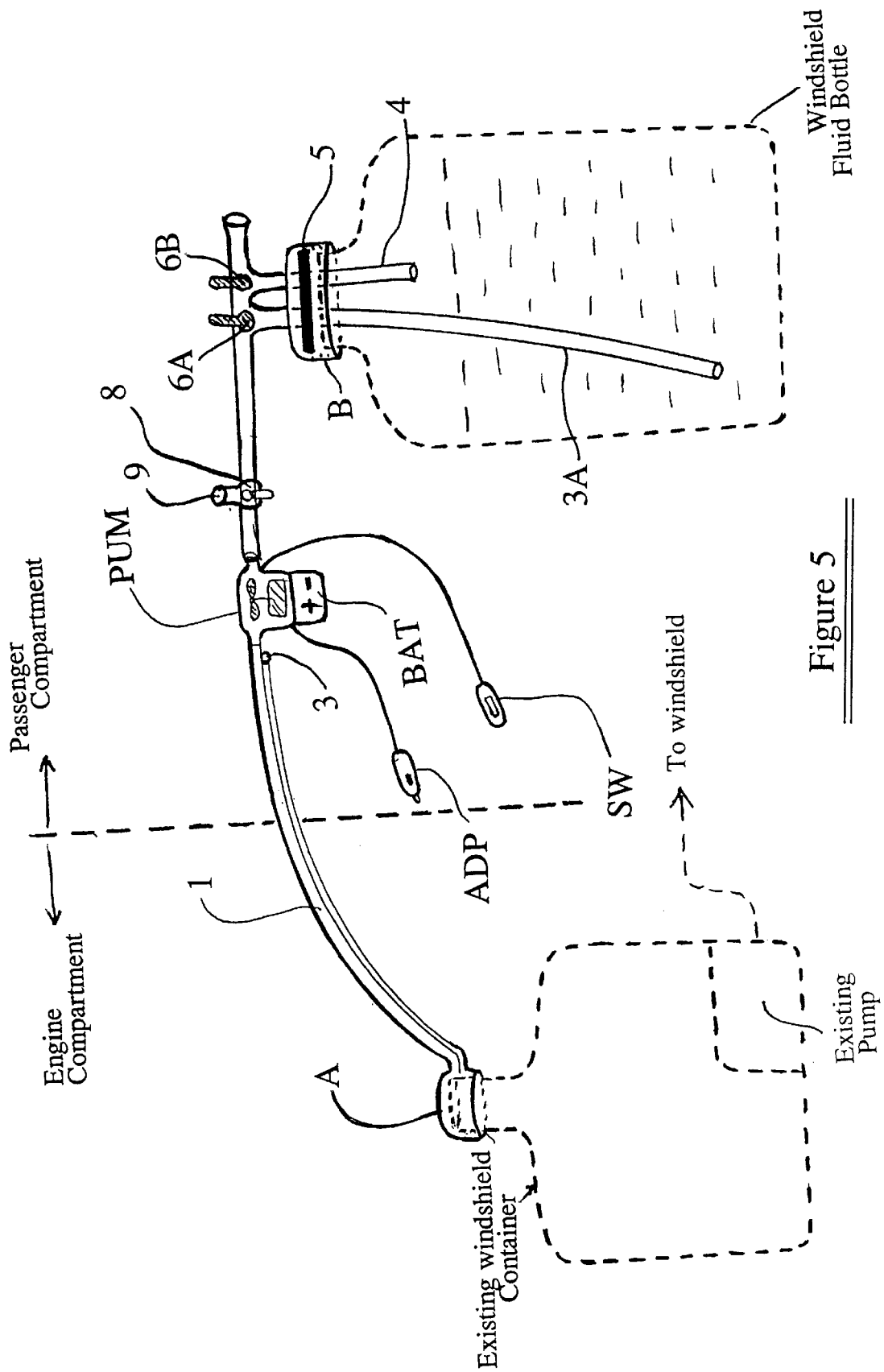
FIG. 5 shows a model that does not have the manual inflation bulb however, it can be attached to it if so desired.

FIG. 5 shows schematically a modified model of the unit similar to the unit shown in FIG. 1 except that in this model the unit does not have the inflation bulb 7. However, this can be attached to the unit if so desired.

Figure 6:
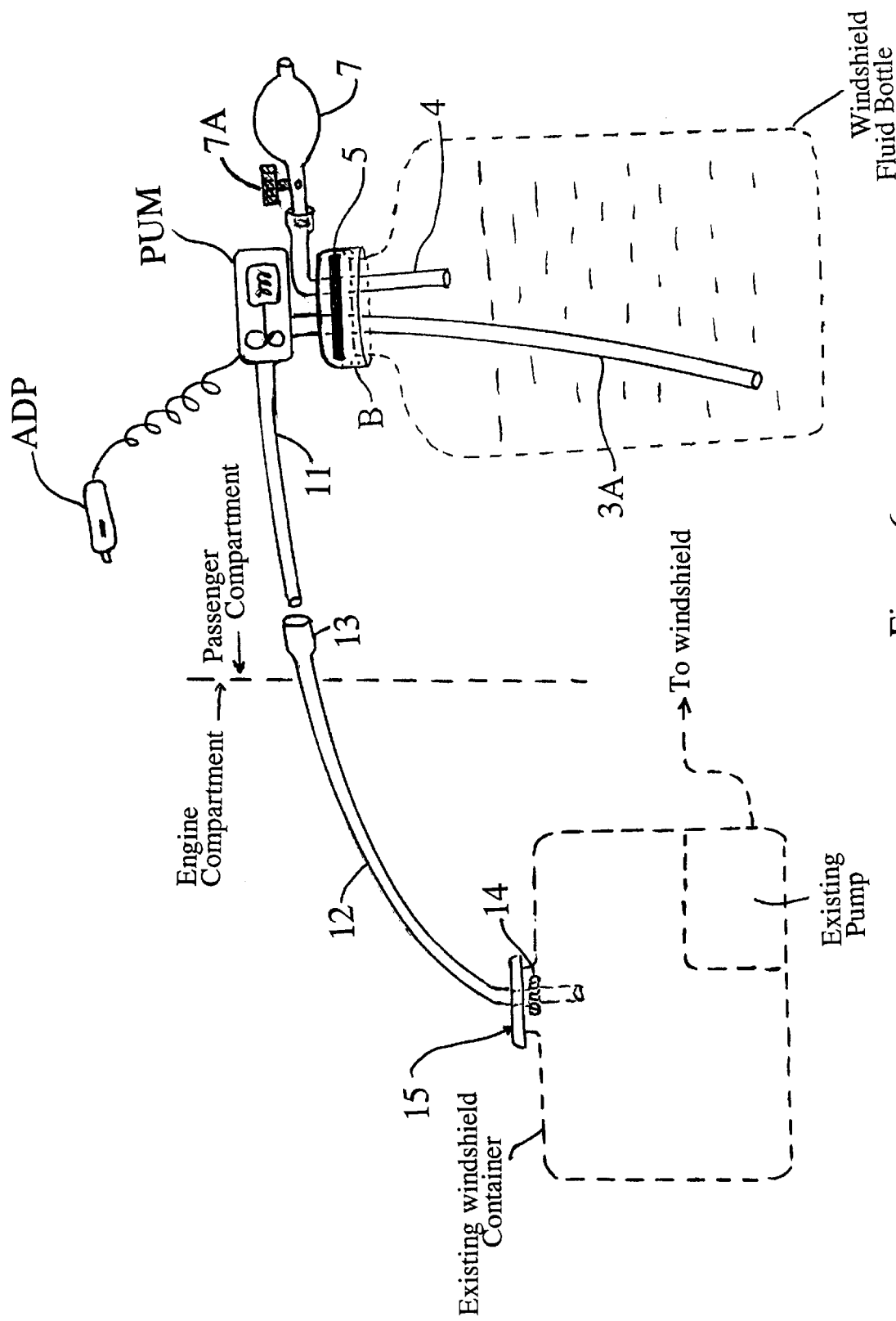
FIG. 6 shows a model that the pump is attached to the cap for the windshield fluid container.

FIG. 6 shows schematically a modified model of the unit similar to the unit shown in FIG. 1 except that in this model the pump PUM is attached to the cap B and this makes a convenient piece that will be attached to the bottle of the windshield fluid easily and will pump the fluid via tubing 11 to the tubing 12 that goes through the cap 15 of the existing windshield container through a hole and is securely kept in place by a bolt or a piece 14. Tube 12 has a connection piece 13 that allows tube 11 to be connected to it conveniently. Pump PUM will be energized by the battery of the vehicle by use of an adaptor ADP that fits the cigarette lighter or alternatively, an adaptor may connect it to a battery pack. The unit may also use a bulb 7 that allows the bottle to be pumped manually. In this case the fluid will be directed to bypass the pump PUM and go to tube 11. The bulb has a valve mean 7A that allows air to go through when open and to close it to air when closed. This allows the bulb to be functional as well as the tube 4 to be used for the air to move into the windshield fluid bottle to prevent vacuum formations. Importantly, in models that do not use a bulb 7 only a hole in the cap 15 or in the connection site of the cap will act to allow the air to go through. No. 15 shows the cap of the existing windshield container.

The pump unit PUM and its related parts can be easily stored under the dashboard area of the vehicle by various means such as VELCRO (TM) patches in order to be moved out for use when desired.

Importantly, the model shown at FIG. 6 can be modified so that the pump PUM will be attached to the cap of the existing windshield container of the vehicles. In these models only the tube of the pump will be attached to the windshield fluid bottle. This will be a very convenient way of using these units and will make this task easy for the users. The pump PUM will be attached to the battery of the vehicle and a switch will be available for the occupants of the vehicle to use. A control means may also be used with these units in order to turn the pump PUM off when the container is filled up. This control means may use various models of the fluid level control systems that are shown in this application, are available, or that may be designed in the future. This part will be placed inside the existing windshield container and will be wired to the pump so that when the level of the fluid reaches the desired level it will shut off the pump. Such a model is shown at FIG. 7.

Figure 7:
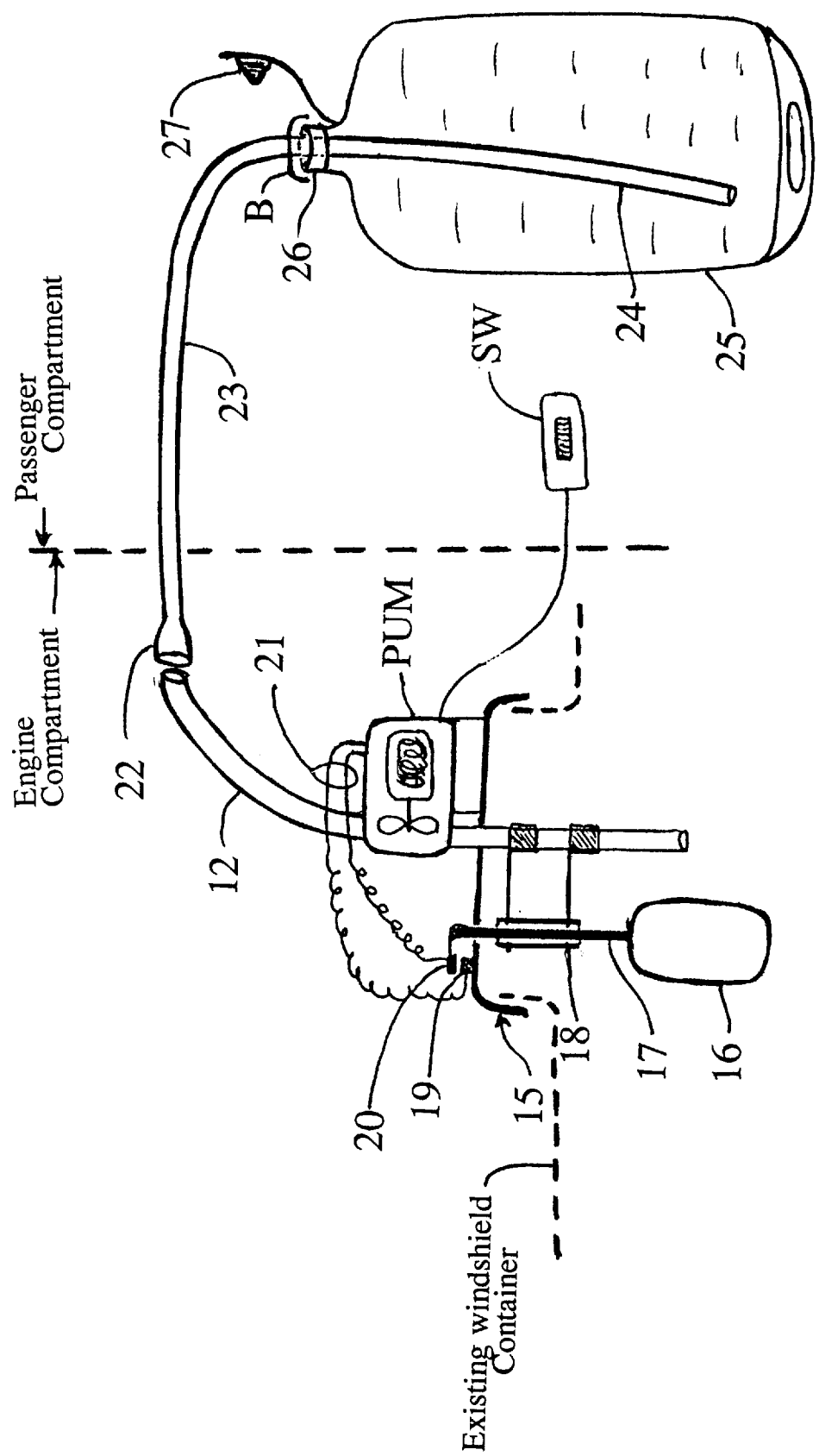
FIG. 7 shows a model that the cap is attached to the cap of the existing windshield container.

FIG. 7 shows schematically a modified model of the unit similar to the unit shown in FIG. 6 except that in this model the pump PUM is attached to the cap 15 which fits the top of the existing windshield container. This piece has a tubing 12 that will be attached to the bottle of the windshield fluid easily by connecting to another tube such as tube 23 by the use of a connection means 22. Tube 23 is connected to the cap B and the tube 24. These parts will be kept inside the passenger compartment and will be ready to be connected to the windshield fluid bottle. In order to prevent overflow of fluid during the pumping periods, these units may have units that will turn the pump PUM off when the container is filled up. This part may be made from various models such as a simple model shown at this figure. In this model, an air bottle 16 has a pole 17 that can move up and down inside the matching tubing 18. Tube 18 is connected to the extension of tube 12 or it can be connected by a pole to the cap 15. The end of the pole 17 has an electrical lead 20 that will contact a matching electrical lead 19. The electrical leads 19 and 20 are connected to the pump PUM by wire means 21 and are designed in a way so that when the fluid level is less than the desired level in the existing windshield container the electrical circuit is complete and allows the pump to run. However, when the pumping of the windshield fluid brings the level of the fluid to the desired level, the fluid will push the air bottle 16 up and this will disconnect the electrical circuit by raising the pole 17.

The electrical switch SW allows the pump to be turned on and off and will be available to the occupants of the vehicle. This control means may use any other models of such control systems that are shown in this application, are available in the market, or that may be designed in the future. This part will be placed inside the existing windshield container and will be wired to the pump so that when the level of the fluid reaches the desired level it will shut off the pump.

The pump PUM will be energized by the battery of the vehicle. Alternatively, an adaptor ADP that connects the unit to the cigarette lighter or that will connect it to a battery pack may be used. Importantly, these units may be made to be part of the new vehicles of any kind and only the tubing to be left in any desirable spot inside or outside of the vehicles.

The air inside the existing windshield container will be allowed to escape via an opening in the cap 15. Tube 12 will be connected to a matching tube 23 that has a connection piece 22. Tube 23 has tubing 24 to suction the fluid from the windshield fluid bottle and will have a proper cap for it. This figure also introduces special containers for these windshield fluids that are made from a flexible vinyl so that the volume of the container will decrease when the fluid is used up. This has the advantage in that the volume of the container will decrease with use and will not annoy the occupants of the vehicle. In these models, the use of tube 4 will be optional since they will not need an opening such as tube 4 since the container will shrink during the emptying process. These containers will be made from clear vinyl such as the one shown at 25 and have a properly shaped tip 26 which may be made from a rigid polymer; it has a cap 27 that will close the opening when desired. This unit may be made to be clear in order to show the fluid amount as well. Different models of the cap for this unit and its related tubing for these containers may be chosen to allow an easy connection of the cap B to its own cap.

Figure 8:
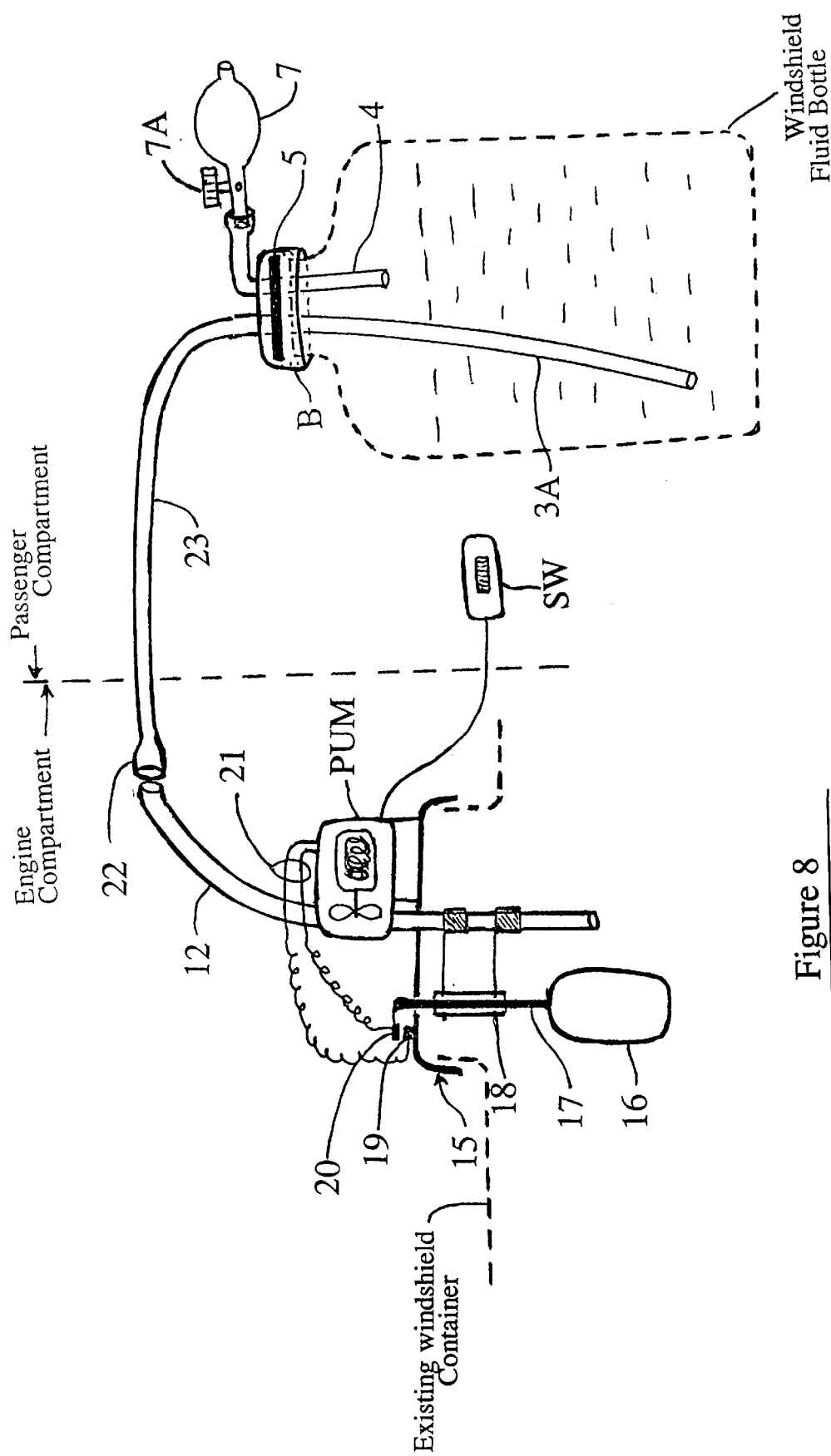
FIG. 8 shows a model of the unit similar to the unit shown in FIG. 7 that has a hand held pump.

FIG. 8 shows schematically a model of the unit similar to the unit shown in FIG. 7 except that in this model the unit has the pump PUM as well as the manual pump 7 and related valve 7A that allow the fluid to be pumped if the electrical pump is not functional. This system will allow the fluid to bypass the pump and fill the existing windshield fluid container. Also, in this model the windshield fluid container may be made from a flexible material such as vinyl.

FIG. 9 shows schematically a rather flat protective cover piece 28 that is designed to go over tubes 3A and 4 from the cap B so that the cap will fit the top of this unit and this protective cover piece will keep the parts inside. This piece has a piece of VELCRO (TM) shown at 29 that allows it to be attached to a matching piece under the dashboard area or any proper area securely.

DETAILED EXPLANATION OF THIS INVENTION

Driving in bad weather has many problems. One problem is running out of windshield fluid. In some of these conditions such as in long drives when the roads are dirty the windshields need to be washed frequently. At one point this will finish the fluid of the reservoir which has to be replaced. However, the replacement of fluid in the vehicles is not easy and requires opening the hood and reaching the container. This process is difficult, unpractical, not a clean job and at times can even be dangerous, especially for untrained personnel and particularly in a wrong place in a dark, remote area in the cold, or during a blizzard. For this reason, this applicant introduces a mechanism and means that will eliminate this problem. In this method a tube is connected to the windshield fluid container of the vehicle. This tubing will be piped properly into the vehicle itself or any proper part such as the trunk of the vehicle. This tube will have openings along its way in front of the vehicle, in the rear part as well as in the trunk in order to make access into the circulation possible. One end of this tube will have a connection that will allow it to be attached into the container of the fresh windshield fluid. This connection will be tight and will allow one of the following methods to be used for pumping the fluid into the windshield fluid container:

a. The unit may use an electrical pump to suction pump the fluid out of the fresh washer fluid container. This pump will use either a battery of its own or the battery of the vehicle via its cigarette lighter, etc.

b. The unit may use an electrical pump in order to create compressed air inside the container of the fresh windshield fluid container. This compressed air will push the fluid out of the container of the fresh washer fluid. This unit will either use a battery of its own or the battery of the vehicle via its cigarette lighter, etc.

c. The unit may use a hand-held inflation bulb in order to create compressed air inside the container of the fresh windshield fluid container. The compressed air will push the fluid out of the container of the fresh washer fluid.

d. Any other kinds of pumps or suction devices may be used in order to allow the fluid to be suctioned, pumped or drained from the container of the fresh washer fluid into the windshield fluid container of the vehicle. Any other source of energy may also be used for this purpose.

Importantly, the tube will be connected to a cap that will fit the container of the windshield fluid container in order to allow it to be used for this purpose.

An example of the prototype of this unit is shown in FIG. 1. This figure shows schematically the general construction of a windshield fluid disposing system. In this model the unit has a cap A that is shaped and sized to match the top of the windshield fluid container of the vehicle. The unit also has cap B which, importantly, is designed to have a proper size and construction to fit the top of the commonly used containers of fresh windshield fluid. This is chosen to provide convenience since it will eliminate extra work of moving the fluid from one container to another by hand. This cap will allow it to be rotated and tightened around the container of the fresh windshield fluid in order to prevent fluid leakage. This cap has a piece 5 that will fit the opening of the top of the fresh windshield fluid container and allow the body of the cap B to be rotated in order to be fixed on top of the container of the fresh windshield fluid. The pump is shown at PUM and is basically a battery-operated pump that will pump the fluid out of the fresh windshield fluid container into the existing windshield fluid container of the vehicle via tube 1. Tube 1 may also have an adjacent tube 2 in order to allow the air to escape the existing windshield fluid container of the vehicle by the opening 3 of this tubing. The pump PUM may use a battery shown at BAT for the energy or it may be connected to the electricity of the vehicle by an adaptor symbolically shown at ADP. The switch SW allows the pump to be turned on and off. This unit may be pumped by a hand pump symbolically shown at 7. This hand-held pump has a valve that allows this part to be open or closed to outside air. This valve will allow the air to be suctioned inside the container during the pumping period. Importantly, when the hand-held pump is used, the fluid will bypass the pump PUM. The unit will also use the three-way stopcock 6 to allow the direction of the air and the fluid to be controlled. Tube 4 will allow air to be pumped into the bottle of the fresh windshield fluid container and tube 3A will allow the fluid to be taken out of the container. The three-way stopcock 8 will allow another tube to be connected to this system. Opening 9 will be used for this purpose.

At the time of use cap A will be placed on top of the windshield fluid container of the vehicle and this connection will made to be safe and tight. Cap B will be connected and tightened on top of the fresh bottle of windshield fluid container. Then the fluid will be pumped out of the fresh windshield fluid container by the pump PUM into the windshield fluid container of the vehicle. An indicator will be used to stop the engine when the windshield fluid container of the vehicle is full. This can be of many kinds: one kind will use an air-filled balloon that will move up when the fluid moves up and will shut the electricity off when moves up. The switch SW will start the pumping. Alternatively, the hand-held pump 7 will be used to create compressed air inside the container of the fresh windshield fluid container. The compressed air will push the fluid out of the container of the fresh washer fluid. Importantly, an electrical pump may also be used in order to create compressed air inside the container of the fresh windshield fluid container. This compressed air will push the fluid out of the container of the fresh washer fluid. This unit will either use a battery of its own or the battery of the vehicle via its cigarette lighter, etc.

Places in which this unit can be placed.

This unit can be placed on any proper part of a vehicle. Ideally, this unit will be installed in new vehicles and will only have cap B and related tubes placed inside the vehicle, in the rear of the vehicle or inside its trunk. Thus, this will be ready and will have the switch properly placed inside the vehicle for use. When the need occurs, the cap B will be connected to the top of the container of fresh windshield fluid after its existing cap is removed and will then be functional.

A. In the new vehicles the unit may be placed inside the trunk. The trunk will have a space available to hold the bottle of fresh windshield fluid container and will have the cap B connected to it before use.

B. In the new vehicles the unit may be placed inside the body of the vehicle. This space will have proper bands, straps, wraps, or a space available to hold the fresh windshield fluid container and to have the cap B connected to it before use.

C. The new vehicles may have a space under the hood with proper bands, straps, wraps, or a space available to hold the fresh windshield fluid container and to have the cap B connected to it in order to be functional.

D. In the new vehicles the vehicle may have a proper opening with the cap B or its tube in the body or adjacent to the body of the vehicle in order to allow the windshield fluid to be drained into it and to suction the fluid into the existing windshield fluid container by pump.

E. Many other designs may be made for the new vehicles and mostly in these vehicles the electrical pump PUM will be placed in a proper place in the engine compartment area. It may be attached to the body of the car in the engine compartment and to be connected to the electrical system of the car and only its tubings to be extended to the existing windshield container from one side and to the cap B from the other side. So that the incoming tube will bring fluid from windshield fluid container to the pump and the outgoing tube will deliver fluid into the existing windshield container. This tubing may be placed into the existing windshield container by the use of a new cap that fits the top of the existing windshield container or via a hole that can be made by various means on the existing cap 15, FIG. 6 of the existing windshield container. The tube may be fixed on this cap by use of a nut such as the one shown at 14, FIG. 6. The incoming tubing to the pump will have a cap such as cap B that will fit the top of the container of the windshield container. This cap will be kept inside the vehicle in the passenger compartment and will be properly kept and attached in a place such as under the dashboard area, to be released and attached to the windshield container when needed. The pump will be wired and connected to the electricity of the car and the on and off switch will be placed on the dashboard or in a proper area. Proper connections of the tubing will make them secure in the area. In some cases, the cap B may be placed in the trunk of the vehicle and the trunk will be altered to have a space available in order to hold the bottle of the container of the windshield fluid and to have securing means such as bands, straps, wraps, doors, etc., in it in order to hold the container of the windshield fluid securely. After the container is in place then the cap B will be connected to the top of the container, making it ready for use. The on-off switch may be placed on the dashboard to allow the pump to be turned on when desired. This will be a prophylactic action for some users in that they know the need is eminent or simply want to have a reserve available for them for use.

The pump of this system may be placed anywhere in the body of the vehicle and only the cap B or the related tubings and wirings are to be placed in a proper place that will be convenient for use. Therefore, the cap B will be mostly inside the vehicle to be convenient for use, although in some cases it may be placed in the trunk of the vehicle or at another site. Many variations of such a plan will be possible.

Importantly, an electrical pump may be used instead of the hand pump 7 to pump air into the container and to pump fluid out of the container. Proper sealing means will be used to prevent air and fluid leakage.

Automation of these units.

These units may be automated in order to allow the jobs to be done without a person to check the level of fluids. This will eliminate some of the worries about the level of fluid and will alarm the driver if the fluid level drops, etc.

This can be done with the use of many indicators. One simple indicator is shown at FIGS. 2 and 3. FIG. 2 shows schematically a unit and method that allow the electrical system to be on for as long as the level of the fluid is lower than a set level. In this figure, a container holds the windshield fluid and an air-filled small globe 11Z has a lever 12Z which is connected to a coneshaped electrical conductor piece 13Z. When the level of the fluid is low, the globe will move down along the tube 18Z that holds the lever 12 securely. Tube 18Z will be fixed on to the body of the windshield fluid container or, in some cases, on to the cap of the windshield fluid container. Then cone 13Z will connect the electrical leads 14Z and 15Z electrically and this action will make the electrical circuit between the wire means 16Z and 17Z complete. This electrical circuit can be used for various purposes. In this case, the electricity will turn the pump on and will keep it going for as long as the fluid level is high enough to raise the globe above the desired level which will then shut the pump off. This mechanism will keep the pump running for as long as the fluid level has not reached the set level. This unit will be small so that it can be placed inside the existing windshield container of the vehicle or it may miniaturized to be part of the cap A.

Another model is shown at FIG. 3. This unit will be used to turn the electrical system off and turn an alarm or an indicator light on if the level of the fluid is lower than a set level (the alarm and the indicator are not shown in these pictures). In this figure, an existing windshield container holds the fluid and an air-filled small globe 19Z is connected to a lever 20Z which is connected to a cone-shaped electrical conductor 21Z. When the level of the fluid is high the globe will move up along the tube 22Z which holds the lever 20Z securely while it allows the lever 20Z to move up and down. Tube 22Z will be fixed onto the body of the existing windshield fluid container or onto the cap of the container. Cone 21Z will connect the leads 23Z and 24Z electrically and this will make the electrical circuit between the wire means 25Z and 26Z complete and able to be used for any purpose. In this case, the electrical circuit will prevent an alarm from sounding and it will also allow the pump PUM to run. When the fluid level falls lower than a set level the electrical system will turn off and it will sound an alarm to indicate the lack of fluid. This unit will be small so that it can be inserted and placed inside the container of the windshield fluid or it may be miniaturized to be part of cap B. Depending on the type of bottle in which the windshield fluid is placed, the make-up of this unit may be changed. For example, in cases in which the container is to be permanently used this unit may be made to be part of the container and in cases which the container is disposable this will be made to be part of the cap B which will be inserted into the container.

Importantly, the container of the windshield fluid may be placed in the trunk or any other proper areas of the vehicle's body and it may have many openings connected to it or by a tubing which will carry the fluid to the existing windshield fluid container. Attention will be paid to place the unit in an area in which the fluid does not freeze easily. The heat and electrical energy of the vehicle will be used to prevent freezing. The container may also be placed inside the vehicle or an area that will prevent freezing of the fluid inside the tubing. Insulation may be used to prevent the fluid from freezing inside the tube. Also, proper means may be used to warm the fluid or to liquidize the frozen fluid or the line of fluid as quickly as possible. A fluid route may be used to get close to the warm areas of the vehicle.

These units may use different valves such as one-way, two-ways or multiple-ways valves or stopcocks in order to allow the direction of the fluid to be chosen in a desired way and the connections between the tubings and other parts such as the caps may also vary in order to make secure and easy connections.

Importantly, in the new vehicles the container of the windshield fluid may be placed in the trunk of the vehicle since this will make it an easy place to add fluid or, alternatively, the unit may have a smaller container in the front and a regular-sized container in the trunk which will allow the commonly used windshield fluid container to be connected to the system for use. Again, attention will be paid to place the unit in an area in which the fluid will not freeze easily and the heat and the electrical energy of the vehicle will be used to prevent freezing. Also, the container may be placed inside the vehicle such as under the seats or an area that will prevent freezing of the fluid and the tubing. Proper means may be used to warm the fluid or to liquidize the frozen fluid or the line of the fluid as quickly as possible. A fluid route may be used to go close to the warm areas of the vehicle in order to be warmed.

Use of Alarms and Different Indicators

These units may also use an alarm system or indicators in order to allow a low level of fluid to be known. The basic methods of such units are shown in FIGS. 2, 3 and 7. These methods can easily be modified in order to make an alarm or an indicator to show the level of the fluid in the container if it is lower than a set level. Various other methods may be designed or other existing available units may be used for this purpose. This unit will be small so that it can be placed inside the existing windshield fluid container, it can be part of the durable windshield fluid container (in this case, the fluid has to be poured into it), it may be miniaturized in order to be part of the cap B to be inserted into the windshield container, or it can be part of the cap or the container of the existing windshield fluid container.

The use of indicators of the level of the fluid in the existing windshield container. In order to prevent running out of windshield fluid an indicator will be placed inside the existing windshield container that will make a light to turn on or an alarm to sound when the level of the fluid drops in the existing windshield container. This will use the same principles that are shown at FIGS. 2 and 3 except that the design will make an electrical circuit complete when the level of the unit falls below a predetermined level. This can be made from a unit similar to the one shown at FIG. 7 except the pole of this air bottle such as one shown at 16 will be chosen to be long so that as long as the level of the fluid is not low enough the electricity circuit will be incomplete. Only when the fluid reaches the predetermined lower level will the circuit will be functional and cause the alarm light to turn on. This unit will be similar to the one shown at FIG. 7, but the complete unit will have two different sets of the units shown at No. 16–20: One will turn the pump PUM off when the level of the fluid reaches a predetermined level and the other will turn an alarm or a light on when the level of the fluid is lower than the predetermined level.

The use of different containers. Although the use of these units are mentioned to be used with the existing containers, these units may use specially-made containers in order to facilitate their usage. These containers may be made to be in different sizes and shapes that will facilitate their use. They may be round and thin and flat. The containers may be made to have the following shapes:

1. The containers may be made to have a rigid body.
2. The containers may be made to have a soft body such as bags made from very flexible vinyl.
3. The containers of the fresh windshield liquids may be used for dispensing the fluids. This method has the advantage that it will not need taking the fluid out from one container to another.
4. The containers may be made to be a flat unit in order to allow them to be placed under the seats or the feet areas of the vehicles.
5. The containers may be made to have handles to allow them to be hung in an area of the vehicles.
6. The containers may be made to be placed on the bumpers of the vehicles and to be held in place securely inside a proper space or by use of straps.

The use of soft and flexible containers with these units.

The use of rigid plastic windshield containers are common and will be used with these units; however, they have the problem of occupying the entire space even when the amount of fluid inside them is very little. This will be annoying when the container is inside the vehicle. For this reason, the applicant introduces special containers for these windshield fluids that are made of flexible vinyl so that the volume of the container will decrease when the fluid is used up. This has the advantage in that the volume of the container will decrease with use and will not annoy the occupants of the vehicle. In these models, the use of a tube or opening such as tube 4 for suctioning the air will be optional or, in fact, may not be needed since these containers will shrink during the emptying process. These containers will be made from clear vinyl such as the one shown at 25 and have a properly shaped tip 26 which may be made from a rigid polymer. This has a cap 27 that will close the opening when desired. This unit may be made to be clear in order to show the fluid amount as well. Different models of the cap for this unit and its related tubing of these containers may be chosen to allow easy connection of the cap B to its own cap. The other advantage of these containers is that they will use a smaller space for packaging and transportation as well. Importantly, the model shown at FIG. 6 may also use flexible bottles as well. These bottles will be useful even for commonly used purposes as well.

The use of different caps with these units. These units may use different caps with different sizes, shapes, structures, etc., in order to fit different containers and match different brands of the containers so that it will allow these units to be used in different vehicles and vehicles. Also importantly, the tubes of these units may be placed inside the existing windshield containers via a hole made in the existing cap of existing windshield containers. A proper securing means such as the use of nuts may be chosen to keep these parts securely in place.

The use of different tubings with these units. These units may use different kinds of tubing for the transfer of fluids in different areas of the vehicles. These tubes may have different sizes, make-ups and structures in order to allow these units to be used with different containers and match different brands of the containers so that it will allow these units to be used in different vehicles and vehicles. The tubes will enter from under the hood area into the body of the vehicle through holes in the vehicle body.

The idea of using flexible bags for these kinds of containers is so lucrative that it can be used for daily used cases such as milk or drink containers and juices as well. This applicant reserves his right to apply for such an invention if it proved to be noble and permitted under the law.

The use of different connection means with these units. These units may use different connection means in order to connect the tubes with other tubes, caps and containers. The connection means may have different sizes, shapes, structures, etc., in order to fit different parts of these units and allow them to be used with different brands of the containers and their related parts. This will allow these units to be used in different vehicles and vehicles.

The use of different means to hold the containers securely. The containers of these units may be kept securely in place by the use of different methods and means. They may be placed inside a space that is designed for these containers.

1. These spaces may be made from a flexible material that will hold the container inside and when not in use they can be folded so that they will not occupy much space.
2. The containers may be held in place securely by the use of bands, straps and wraps so that after use and when not needed the containers may be removed and the holding means can be folded to occupy a small space.
3. The containers may be held in place with use of straps that have a VELCRO (TM) body that will allow them to be securely held in place. These can then be folded to occupy a small space when not in use.
4. Many other similar methods may be used for these purposes.

The use of electrical means from the vehicles for these units. These units may use batteries for their functioning and, alternatively, they may be connected to the electrical system of the vehicles by one system or another. They may use cigarette lighters, different electrical openings, or a special wiring that may be used for this purpose only.

The use of different sensor leads for detection of fluid levels with these units. These units may use different kinds of sensors for detection of the fluid level. They may also use different electrical brakers to interrupt electricity with these units as well.

These units may use a number of valves and three-ways stopcocks in order to allow the direction of the fluid to be easily chosen. One such model is shown at FIG. 4. This figure schematically shows a windshield fluid disposing system which is similar to the unit shown in FIG. 1 except that in this figure the unit has a three-way stopcock 6B that allows the direction of the fluid to be chosen more easily and it allows the closure of the openings that are desired to occur. This figure also schematically shows the passenger and the engine compartments, and schematically shows the existing windshield container and its related pump and shows that the fluid eventually moves to the windshield. Also, the windshield fluid bottle is shown schematically and the cap B attaches to it to secure the piece 5. Importantly, in the new vehicles some parts of these units such as the pump PUM may be placed under the hood for better and less space occupying action.

Use of models that have the pump on top of the caps. Importantly, the pump of these units may be attached to the cap of each bottle; this will allow more convenient units to be made for use. FIG. 6 shows schematically a modified model of the unit similar to the unit shown in FIG. 1 except that in this model the pump PUM is attached to the cap B and this makes a convenient piece that will be easily attached to the bottle of the windshield fluid and will pump the fluid via tube 11 to tube 12 that goes through the cap 15 of existing windshield containers through a hole and is securely kept in place by a bolt or a piece 14. Tube 12 has a connection piece 13 that allows tube 11 to be conveniently connected. Pump PUM will be energized by the vehicle's battery by the use of an adaptor ADP that fits the cigarette lighter or, alternatively, an adaptor may connect it to a battery pack. The unit may also use a bulb 7 that allows the bottle to be pumped manually. In this case, the fluid will be directed to bypass the pump PUM and go to tube 11. The bulb has a valve mean 7A that allows air to go through when open and prevents air from entering when closed. This allows the bulb to be functional as well as the tube 4 to be used for air to move into the windshield fluid bottle to prevent vacuum formations.

Importantly, in models that do not use the bulb 7 only a hole in the cap 15 or the connection site of the cap will act to allow the air to go through. No. 15 shows the cap of the existing windshield container. The pump unit PUM and its related parts can be easily stored under the dashboard area of the vehicle by various means such as VELCRO (TM) patches in order to be moved out for use when desired.

Importantly, the model shown at FIG. 6 can be modified so that the pump PUM will be attached to the cap of the existing windshield container of the vehicles. In these models, only the tube of the pump will be attached to the windshield fluid bottle. This will be a very convenient way of using these units and will make this task easy for the users. The pump PUM will be attached to the vehicle's battery and a switch will be available for the occupants of the vehicle to use. A control means may also be used with these units in order to turn the pump PUM off when the container is filled up. This control means may use various models of the fluid level control systems that are shown in this application, are available, or that may be designed in the future. This part will be placed inside the existing windshield container and will be wired to the pump so that when the level of the fluid reaches the desired level it will shut off the pump. Such a model is shown at FIG. 7.

FIG. 7 schematically shows a modified model of the unit similar to the unit shown in FIG. 6 except that in this model the pump PUM is attached to the cap 15 which fits the top of the existing windshield container. This piece has a tube 12 that will be attached to the bottle of the windshield fluid easily by connecting to another tube such as tube 23 by use of connection means 22. Tube 23 is connected to the cap B and the tube 24. These parts will be kept inside the passenger's compartment and will be ready to be connected to the windshield fluid bottle. In order to prevent overflow of the fluid during the pumping periods, these units may have units that will turn the pump PUM off when the container is filled up. This part may be made from various models such as a simple model shown in this figure. In this model, an air bottle 16 has a pole 17 that can move up and down inside the matching tubing 18. Tube 18 is connected to the extension of tube 12 or it can be connected by a pole to the cap 15. The end of the pole 17 has an electrical lead 20 that will contact a matching electrical lead 19. The electrical leads 19 and 20 are connected to the pump PUM by wire means 21 and are designed in a way so that when the fluid level is less than the desired level in the existing windshield container the electrical circuit is complete and allows the pump to run. However, when the pumping of the windshield fluid brings the level of the fluid to the desired level, the fluid will push the air bottle 16 up and this will disconnect the electrical circuit by raising the pole 17. The electrical switch SW allows the pump to be turned on and off and will be available to the occupants of the vehicle. This control means may use any other model of such control systems that are shown in this application, are available in the market, or may be designed in the future. This part will be placed inside the existing windshield container and will be wired to the pump so that when the level of the fluid reaches the desired level it will shut off the pump. Pump PUM will be energized by the vehicle's battery. Alternatively, it may use an adaptor ADP that connects to the cigarette lighter or a battery pack. Importantly, these units may be made to be part of the new vehicles of any kind and only the tubing will be left in any desirable spot inside or outside of the vehicles. The air inside the existing windshield container will be allowed to escape via an opening in the cap 15. Tube 12 will connect to a matching tube 23 that has a connection piece 22. Tube 23 has tube 24 for suctioning the fluid from the windshield fluid bottle and will have a proper cap for it.

Importantly, the size, shape, thickness, consistency, contour, material, diameter, placement of different units and lengths, placement of different segments of the tubes, placement of different components of these units, relative sizes of different parts and every other important characteristic of these units and their components may vary as well. These units or parts of the units may be placed in any part of the vehicle, inside or outside, if found to be proper.

I claim:

1. In an automotive vehicle with an engine compartment separated from both passenger and trunk compartments, having a windshield washer fluid reservoir holding a supply of washer fluid and a delivery system for delivery of washer fluid from the windshield washer fluid reservoir to an exterior of a windshield of said vehicle, apparatus for replenishing said windshield washer fluid reservoir comprising: a fluid delivery conduit for delivering replenishing fluid to said windshield washer fluid reservoir, said windshield washer fluid reservoir mounted in said engine compartment, a fitting removably attached to a windshield washer fluid container within one of said vehicle passenger or trunk compartments, said windshield washer fluid container holding a supply of replenishing washer fluid, and pump means operatively associated with said fluid delivery conduit and said fitting for causing fluid to be conveyed through said fitting and fluid delivery conduit to said windshield washer fluid reservoir.

2. Apparatus as set forth in claim 1 in which the conduit comprises a cap for fitting onto a fill of said windshield washer fluid reservoir in replacement of another cap.

3. Apparatus as set forth in claim 1 in which the pump means comprises a manually operated pump.

4. Apparatus as set forth in claim 1 in which the pump means comprises an electrically operated pump.

5. Apparatus as set forth in claim 4 in which the electrically operated pump comprises a suction pump for sucking fluid out of a replenishing fluid container.

6. Apparatus as set forth in claim 4 including an electric circuit associated with the electrically operated pump comprising level sensing means associated with the reservoir for controlling operation of the pump in accordance with the level of fluid in the reservoir.

7. Apparatus as set forth in claim 6 in which the electric circuit associated with the level sensing means associated with the reservoir for controlling operation of the pump in accordance with the level of fluid in the reservoir comprises a high level sensing switch for preventing the pump from operating when the level of fluid in the reservoir is above a predetermined level.

8. Apparatus as set forth in claim 4 in which the electric circuit comprises a jack for connection to an electric socket of a vehicle to supply power to the pump.

9. Apparatus as set forth in claim 1 in which the conduit passes through the fitting.

10. Apparatus as set forth in claim 1 in which the fitting comprises an annular member for fitting onto a neck opening.

11. Apparatus as set forth in claim 1 in which the fitting comprises an annular threaded member for threading onto a threaded neck opening, and a disk whose perimeter is engaged by a flange of the annular threaded member to hold the disk closed against the neck opening.

12. Apparatus as set forth in claim 1 in which the pump means is mounted on the fitting.

13. In an automotive vehicle with an engine compartment separated from both passenger and trunk compartments, a first windshield washer fluid reservoir for holding a supply of washer fluid and a delivery system for delivery of washer fluid from the first windshield washer fluid reservoir to an exterior of a windshield of said vehicle, apparatus for replenishing the windshield washer fluid reservoir comprising a second windshield washer fluid reservoir for holding washer fluid, and a fluid delivery conduit for delivering replenishing fluid from the second windshield washer fluid reservoir located within one of said vehicle passenger or trunk compartments to the first windshield washer fluid reservoir mounted in the engine compartment, and pump means operatively associated with said fluid delivery conduit for causing fluid to be conveyed from said second windshield washer fluid reservoir through said fluid delivery conduit to said first windshield washer fluid reservoir.

14. In an automotive vehicle as set forth in claim 13, wherein said pump means is mounted on one of said reservoirs.

15. In an automotive vehicle as set forth in claim 14, said pump means comprising an electric operated pump mounted on said one of said reservoirs.

16. In an automotive vehicle as set forth in claim 13, said pump means being located in said engine compartment of said vehicle.

17. In an automotive vehicle as set forth in claim 13, said second reservoir comprising a wall that collapses as fluid is conveyed from it to the first reservoir by said pump means.

18. In an automotive vehicle as set forth in claim 13, said pump means is electrically powered and including a self-contained battery means for powering the pump means.

* * * * *